(12) United States Patent
Da Costa

(10) Patent No.: US 10,099,868 B1
(45) Date of Patent: Oct. 16, 2018

(54) SET OF WATER PIPES WITH CAPSULES FOR HEAVY CARGO AND IRRIGATION TRANSPORTATION SYSTEM

(71) Applicant: Otto Kierulff Da Costa, Belo Horizonte (BR)

(72) Inventor: Otto Kierulff Da Costa, Belo Horizonte (BR)

(73) Assignee: OTTO KIERULFF DA COSTA, Belo Horizonte (BR)

( * ) Notice: Subject to any disclaimer, the term of this patent is extended or adjusted under 35 U.S.C. 154(b) by 0 days.

(21) Appl. No.: 15/492,137

(22) Filed: Apr. 20, 2017

(51) Int. Cl.
| | |
|---|---|
| *B65G 51/01* | (2006.01) |
| *B65G 51/18* | (2006.01) |
| *B65G 51/06* | (2006.01) |
| *B65G 51/32* | (2006.01) |
| *A01G 25/06* | (2006.01) |

(52) U.S. Cl.
CPC ............ *B65G 51/18* (2013.01); *A01G 25/06* (2013.01); *B65G 51/06* (2013.01); *B65G 51/32* (2013.01)

(58) Field of Classification Search
CPC ........ B65G 51/01; B65G 51/04; B65G 51/34; B65G 53/44; A63G 3/00; A63G 3/02; A63G 3/04; A63G 3/06
USPC ........................................................ 406/106
See application file for complete search history.

(56) References Cited

U.S. PATENT DOCUMENTS

| | | | | | |
|---|---|---|---|---|---|
| 3,328,089 | A | * | 6/1967 | Hodgson ................ | B65G 51/01 406/105 |
| 3,633,976 | A | * | 1/1972 | Kruyer ................... | B65G 51/04 406/112 |
| 3,731,647 | A | * | 5/1973 | Mimbiole, Jr. ........... | B05C 3/10 118/416 |
| 3,751,297 | A | * | 8/1973 | Minbiole, Jr. ..... | B65G 49/0495 134/26 |
| 3,759,577 | A | * | 9/1973 | Manzer ................... | B65G 51/01 406/117 |
| 3,807,806 | A | * | 4/1974 | Takahashi .............. | B65G 51/01 104/154 |
| 3,870,250 | A | * | 3/1975 | Teodorescu ............ | B65G 51/10 406/10 |
| 3,931,999 | A | * | 1/1976 | McCain ................. | B65G 53/30 406/106 |
| 3,980,024 | A | * | 9/1976 | Futer ....................... | B61B 13/10 104/138.1 |

(Continued)

*Primary Examiner* — Joseph Dillon, Jr.

(57) ABSTRACT

Developed to transport any products, whether industrialized or not, via streams, in different geographic regions. By means of a piping circuit (1) housing distributing stations (3), in suitable points in the region of installation are formed streams driven by hydraulic pumps (2) successively installed along the length of such circuit (1). The streams are provided with conveyor capsules (4) of any industrial objects or not, capable of being carried by these capsules (4). In this way, the piping circuit (1) can be installed so as to cover large a geographic area and, for its internal rapids, to promote the transport of goods of all kinds. For control on delivery, upon stop at the predefined distribution station (3), the corresponding conveying capsule (4) shall be identified by its electronic registration. These capsules (4), after being unloaded at their distribution stations (3), are returned to the circulation by the circuit (1) and so on, thus forming an unprecedented supply system for large geographical regions.

2 Claims, 3 Drawing Sheets

(56) References Cited

U.S. PATENT DOCUMENTS

| | | | | |
|---|---|---|---|---|
| 4,154,484 A | * | 5/1979 | Holzenberger | B65G 53/30 406/106 |
| 4,184,792 A | * | 1/1980 | Turnbo | B61B 13/10 406/110 |
| 4,304,105 A | * | 12/1981 | West | A23L 3/04 104/70 |
| 4,334,806 A | * | 6/1982 | Liu | B65G 51/01 406/147 |
| 4,365,915 A | * | 12/1982 | Neumann | B65G 51/03 406/88 |
| 4,375,374 A | * | 3/1983 | Kronseder | B08B 9/28 134/133 |
| 4,437,799 A | * | 3/1984 | Liu | B65G 51/04 406/110 |
| 4,451,183 A | * | 5/1984 | Lorenz | B65G 53/30 406/197 |
| 4,560,032 A | * | 12/1985 | Imanaka | A47F 10/06 104/73 |
| 4,599,017 A | * | 7/1986 | Russemeyer | B65G 53/16 406/156 |
| 4,619,191 A | * | 10/1986 | Dumas | A23L 3/02 104/73 |
| 4,637,760 A | * | 1/1987 | Boos | B65G 51/01 406/105 |
| 4,840,253 A | * | 6/1989 | DiMaggio | B65G 51/01 104/73 |
| 5,018,440 A | * | 5/1991 | Johnson | A01J 25/167 134/132 |
| 5,433,671 A | * | 7/1995 | Davis | A63G 21/18 104/57 |
| 5,704,733 A | * | 1/1998 | de Greef | B07C 5/36 406/106 |
| 6,068,428 A | * | 5/2000 | Nair | B65G 51/01 406/109 |
| 6,179,088 B1 | * | 1/2001 | Lai | A47F 10/06 104/73 |
| 6,971,317 B2 | * | 12/2005 | McKoy | A63G 33/00 104/53 |
| 6,971,786 B2 | * | 12/2005 | Krambrock | B65G 53/30 366/165.1 |
| 9,751,021 B2 | * | 9/2017 | Schwartz | A63G 3/02 |
| 2001/0056311 A1 | * | 12/2001 | Valerino, Sr. | B65G 51/06 700/214 |
| 2002/0063020 A1 | * | 5/2002 | Shin | B63B 21/18 186/49 |
| 2004/0253061 A1 | * | 12/2004 | Moller | B65G 51/04 406/10 |
| 2006/0162498 A1 | * | 7/2006 | Warner | C21B 13/0006 75/483 |
| 2009/0285642 A1 | * | 11/2009 | De Greef | B65G 51/01 406/12 |
| 2015/0344241 A1 | * | 12/2015 | Lykov | E02C 5/02 405/3 |
| 2016/0159577 A1 | * | 6/2016 | Okazaki | B61F 9/00 198/339.1 |
| 2016/0167896 A1 | * | 6/2016 | Hoganson | B65G 51/36 406/4 |
| 2017/0003084 A1 | * | 1/2017 | Patry | F28D 20/023 |

* cited by examiner

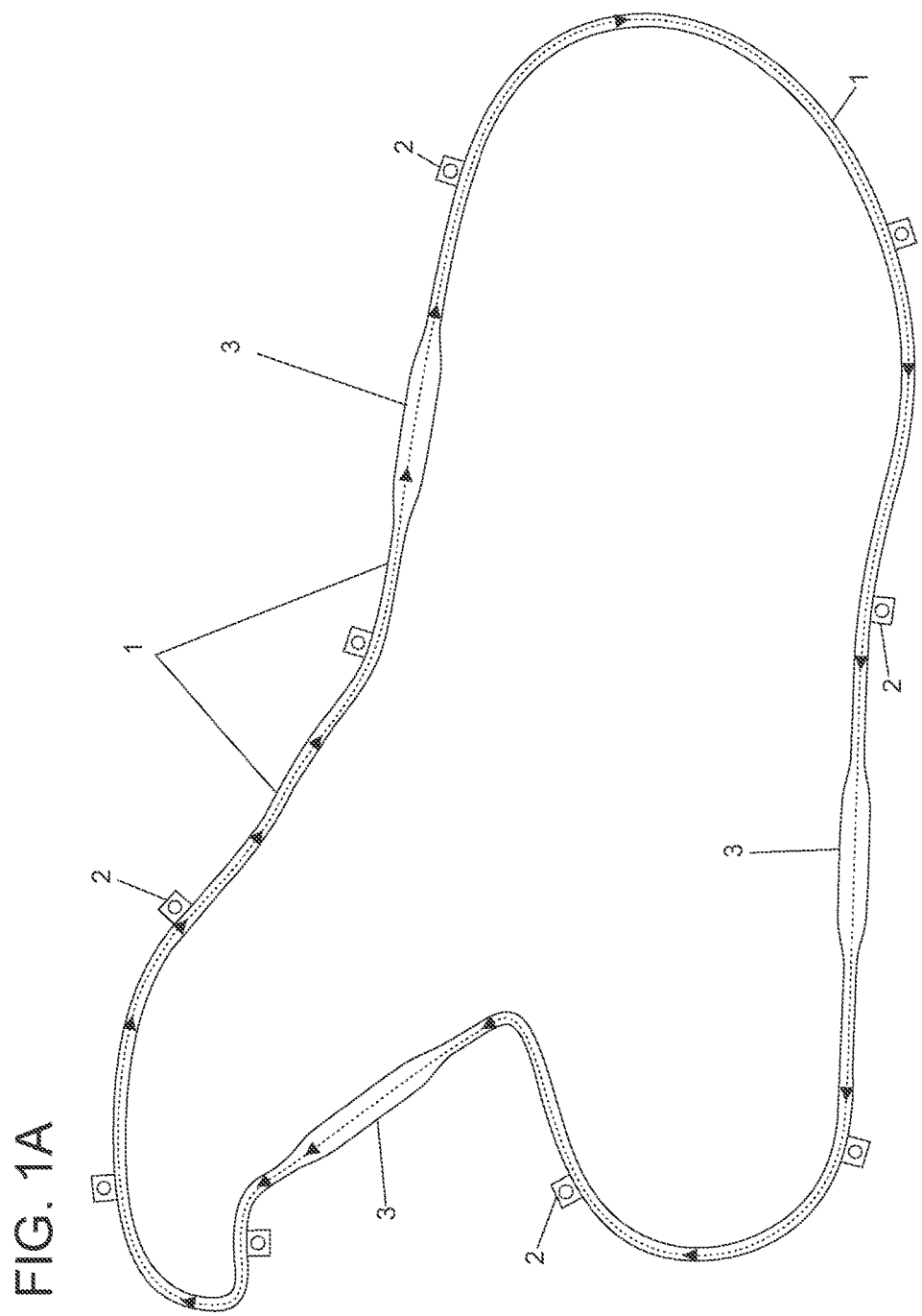

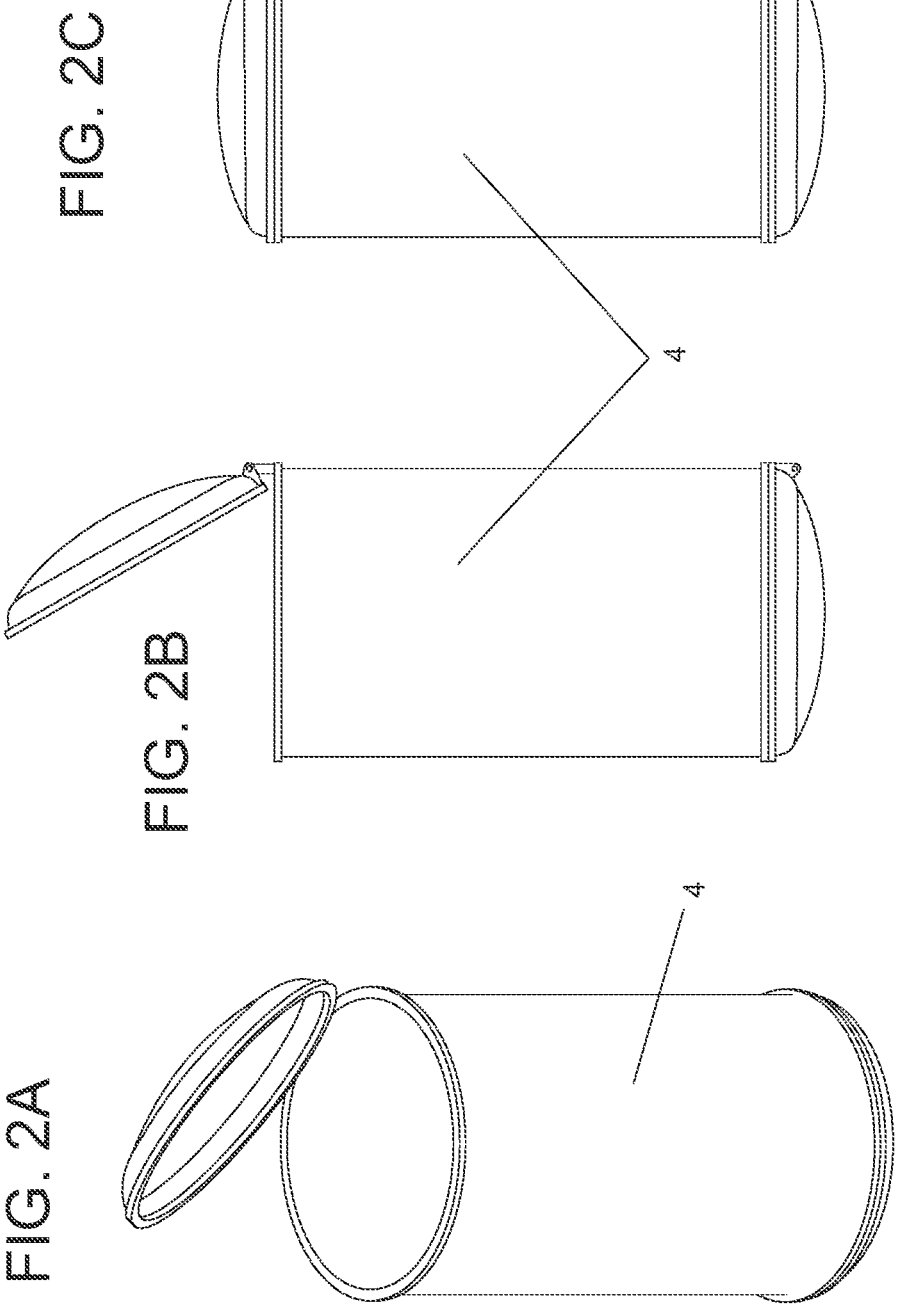

SET OF WATER PIPES WITH CAPSULES FOR HEAVY CARGO AND IRRIGATION TRANSPORTATION SYSTEM

This descriptive report refers to a patent application for a system formed by several pipes arranged so as to compose a closed continuous water system provided with stations at predetermined points for receiving or sending heavy loads through large capsules for environments of any region, whether close or distant one to another.

STATE OF THE ART

As widely known, structures named waterways are used for large-scale and long-distance fluid transportation, i.e., segments of flexible pipes or otherwise, extended from one point to the other of certain urban or rural areas.

In this sense the Brazilian patent document MU 8201568-6, named "WATERWAYS BOTTOM FLEXIBLE SUBMARINE", intended to the transportation of large volumes of fresh water for long maritime distances, comprised of a large-diameter pipe, with 10 m, for the fresh water flow, containing a thin, impermeable, flexible wall, submerged and deposited on the seabed, using a pleated lower pipe, i.e., segmented, filled up with granulated basllat. The pleat prevents the basllat material from slipping lengthwise.

The primary and secondary pipe are slightly inclined upwards, following the undersea relief, that is, the water inlet tip is deeper than the outlet tip so as to benefit from the salt water pressure loss to compensate the fresh water pressure loss, from the primary pipe in the course through the outlet tip and, thus, prevent the primary pipe from collapsing or bursting due to excess pressure. The fresh water shall be collected in a river or treatment station, then pumped into the feeding pipe, which may be made of conventional material or material similar to the primary pipe, provided that more resistant to pressure. After the water ran the primary pipe it flows to the drain pipe, similar to the feeding pipe, thus being released in the surface at the destination. The inclination and diameter of the primary pipe shall depend on the gap and distance as the project may require.

However, these systems are extremely limited to the transport of fluids from one point to another, i.e., it becomes impossible to transport other products such as grains, vegetables, greens or even more robust equipment.

PURPOSE OF THE INVENTION

In order to increase the use of the waterways, the inventor developed a pipeline system with an internal diameter of approximately 6 meters, which shall be connected so as to reach predetermined points in one or more geographic regions, points of the same State or country or even among countries.

These joined pipes receive pumps installed in the same distance along their entire length, used for maintaining a stream of water running inside of the formed waterway, through which the capsules developed specifically for the project shall be transported. These capsules receive different types of material to be transported from one station to another, equally installed at predetermined points along the waterway, according to the project of the region to be covered by this innovative transportation system.

BRIEF DESCRIPTION OF DRAWINGS

Once superficially explained the system herein discussed shall be further detailed according to the attachment images:

FIG. 1A—Schematic view of the formation of a water circuit composed by pipes provided with pumps throughout its length as well as its distribution stations;

FIG. 2A—Perspective view of the capsule with its hatch open;

FIG. 2B—Side view of the capsule with its hatch open;

FIG. 2C—Side view of the capsule with its hatch closed

DETAILED DESCRIPTION OF THE INVENTION

Figure 1B:
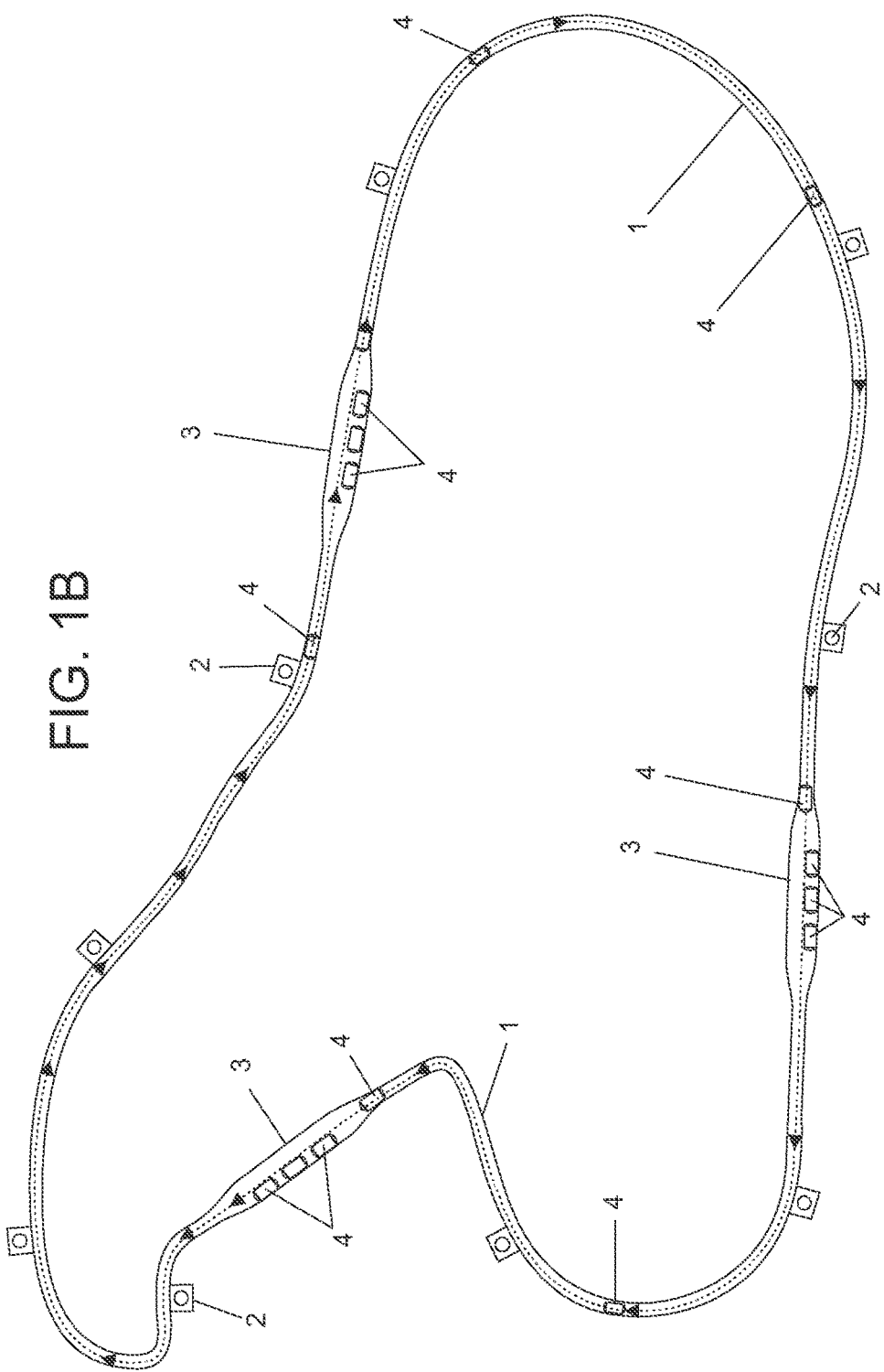
FIG. 1B—View as shown in FIG. 1A, schematically evidencing the capsules traveling inside the pipes as well as waiting to be loaded or discharged in their respective dispensing stations.

As shown in the attachment images, the "SET OF WATER PIPE WITH CAPSULES FOR HEAVY CARGO AND IRRIGATION TRANSPORTATION SYSTEM", object of the patent application hereof, consist in several pipes (1) of approximately 6-meter diameter, connected together so as to form a closed circuit. This circuit, in turn, receives at points equally distant throughout its extension, the installation of water pumps (2), as well as of capsules shipping/unloading distribution stations (3) of conveyors (4) containing electronic records.

One the set is established, the water pumps (2) suck water from an abundant source such as a flowing stream, initially filling up the inlet pipe circuit (1) followed by the formation of the stream along the length, maintained with the hydraulic pumps (2). Thus, from the impulse caused by a pump (2) the water volume is forced in speed until it reaches the subsequent pump (2) which, in turn, releases that same volume of water in speed, always inside the pipe circuit (1), until another pump (2), and so on and so forth.

The pipe circuit (1) works with conveying capsules (4) made of thermally sealed material of geometric configuration suitable for the sliding movement. These conveyor capsules (4) are successively introduced into the pipe circuit (1), along which are directed by the stream formed, reaching each of the distributing stations (3), according to the flow project and the desired geography. When stop at the predefined distribution station (3), the corresponding conveyor (4) shall be identified by its register, which is scanned and stored in a system control central (for the control of goods transport and prevention of transfer of illegal goods). The conveying capsules (4) are loaded with any products manufactured by the industry, whether from the food, automotive, electronic, furniture, clothing segment, or, finally, from the segment of products manufactured in series that shall be disposed of in buck from one geographical region to the other.

Later, the conveyed (4) supplied and sealed capsules are again launched within the pipe circuit (1) for the transportation (under the influence of stream) until the desired geographic point or distributing station (3).

If the capsule conveyed (4) arrives at its destination and it is not discharged, it remains moving by the streams inside the piping circuit (1) until it reaches again the destination distributor station (3), and, in such case, is unloaded and reloaded with new goods and so on.

The conveying capsules (4), once they are thermally and hermetically sealed, allow for the transport of the various products in their environments at suitable temperatures, until their destination.

Additionally to the transportation system, the current water contained within the pipes (1), when passing through geographic regions affected by drought, can be bled and directed to irrigate the soil, thus favoring the environment.

By its construction, the system thus provides an efficient means of transportation, where goods of any kind can travel long distances at low costs and without causing environmental impacts, thus favoring the Environment and agriculture through irrigation instead.

The invention claimed is:

1. A water pipe transportation system for transporting heavy cargos, comprising:
- a plurality of pipes (1) connected together to form a closed pipe circuit;
- a plurality of capsule shipping/unloading distribution stations (3) built at a plurality of points along the closed pipe circuit, respectively, with equal distance between adjacent stations, wherein the plurality of capsule shipping/unloading distribution stations each have a water pump (2) for forcing a water stream in the closed pipe circuit to flow at a pre-determined speed; and
- a plurality of conveying capsules (4) disposed in the closed pipe circuit for transporting cargos, each of the plurality of conveying capsules (4) containing an identification register, which stores identification information of the each of the plurality of conveying capsules (4);

wherein each of the plurality of capsule shipping/unloading distribution stations (3) stores identification information of the plurality of conveying capsules (4), such that the each of the plurality of capsule shipping/unloading distribution stations (3) can identify a conveying capsule that has arrived at the shipping/unloading distribution station.

2. The water pipe transportation system for transporting heavy cargos according to claim 1, wherein a diameter of the plurality of pipes (1) is 6 meters.

\* \* \* \* \*